May 18, 1926.  L. W. BRENNER  1,584,975
POPPET VALVE
Original Filed Feb. 8, 1918
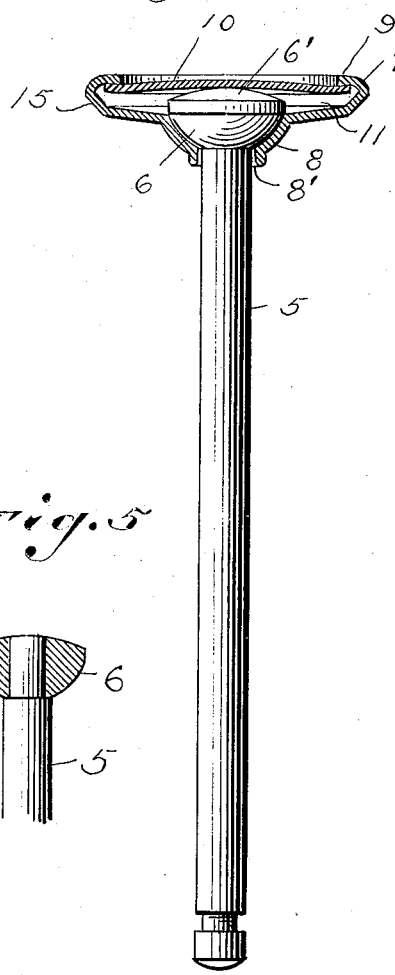
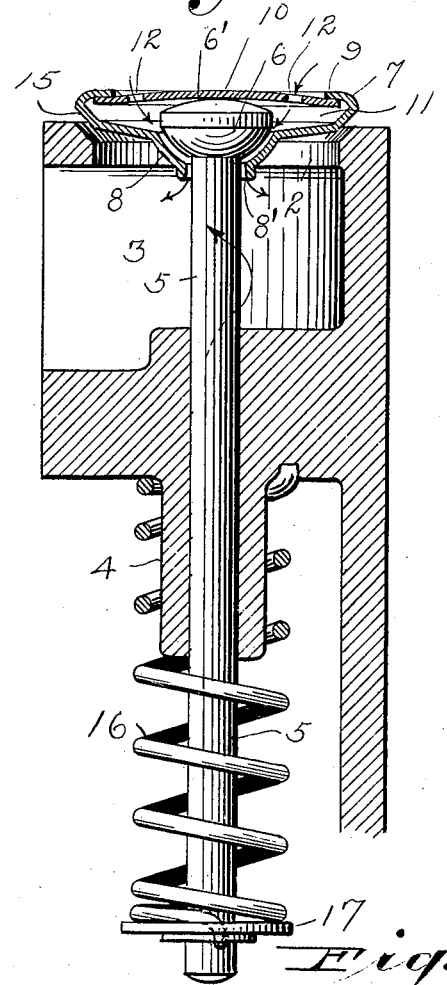
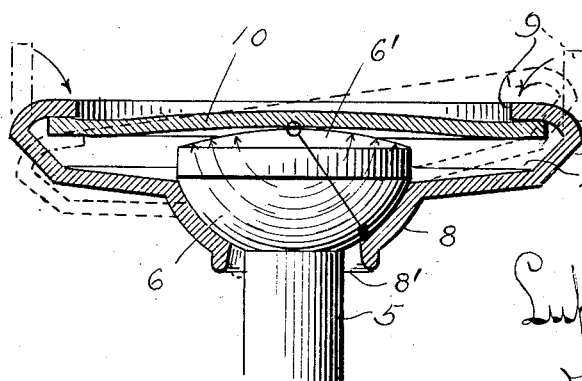
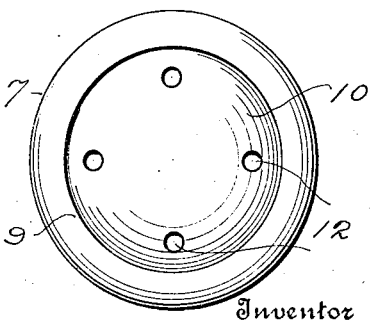
Inventor
Lupus William Brenner
By F. L. Walker
Attorney Patented May 18, 1926.

1,584,975

UNITED STATES PATENT OFFICE.

LUPU WILLIAM BRENNER, OF DETROIT, MICHIGAN.

POPPET VALVE.

Continuation of application Serial No. 216,093, filed February 8, 1918. This application filed June 7, 1920. Serial No. 387,262.

My invention relates to poppet valves and is a continuation of the disclosure of my co-pending application Serial No. 216,093, filed February 8, 1918, since matured into Patent 1,342,419, June 8, 1920.

While the valve construction forming the subject matter hereof is especially designed for use in hydrocarbon engines as inlet and outlet valves, it is applicable to other constructions and purposes, and is therefore not limited to such association.

The invention contemplates a valve head flexibly connected to its stem for independent rotary and tilting movement, enabling it to automatically adjust itself to its seat with minimum lost motion, thus conserving compression and increasing the efficiency of the motor.

The object of the invention is to improve the structure as well as the means and mode of operation of such valves whereby they will not only be cheapened in construction, but will be more efficient in use, automatic in action, uniform in operation, and unlikely to get out of repair.

The valve construction herein described is designed to afford an accurately fitting, quiet operating and quick acting valve which will materially increase the efficiency of explosive engines, particularly those of high speed types commonly employed in automobiles and aeroplanes.

By the herein described construction the cost of production is materially reduced and necessity for extreme accuracy of manufacture is dispensed with. The valve is enabled to wear itself into an accurately fitting contact with the seat and automatically compensates for any unevenness of its bearings thereby insuring smooth uniform action even after the valve stem and guide have become worn out of true. The valve head as hereafter described is flexibly connected with the stem and adapted to automatically find its seat independent of the valve stem and guide. The tendency to warp is reduced to minimum. As more fully set forth in the prior application referred to, the valve may further be made to afford an initial or preliminary relief prior to the opening of the main valved orifice.

The present invention contemplates a relation of the valve head and the head of the valve stem whereby the valve head is permitted an independent adjusting movement with minimum friction or resistance thru a limited range of adjustment, and the induction of a rotary movement of the valve head in relation with its seat, independent of the stem by which uniform contact surfaces are insured and carbon deposits and any unevenness automatically worn away thus eliminating the necessity of grinding.

A further object of the present invention is to embody in a single valve resistance to high degrees of temperature, durability and long wearing qualities, in combination with non-corrosive characteristics.

As is generally recognized a valve, unless fitted with extreme and unusual accuracy performs a double movement in its closing operation and particularly in the event of worn stems or guides, to wit: a longitudinal movement toward its seat and frequently a lateral movement under influence of the retracting spring into final engagement.

The former movement varies with the speed of the motor, while the latter is substantially constant in time value. As the ratio of these movements changes at high speeds, the time of complete closure during each stroke is reduced and the valve being partially open, too great a portion of the cycle results in excessive losses of fuel and compression. Moreover, the repeated seating of the valve in substantially the same position with the same side shifting movement to find its seat causes the valve and seat to wear unevenly, particularly as the parts frequently contain spots of different densities or degrees of hardness.

The compression of the usual helical retracting spring increases its diameter, the ends of the spring tending to rotate or unwind in relation with each other. This torsional action of the retracting spring imparts an alternating twisting movement to the valve stem.

In the present construction the tilting head of the valve automatically adjusts it to the valve seat minimizing its final adjusting movement and so increasing the period of complete closure, while the torsional action of the spring is utilized to rotate the head thru successive steps to afford a constantly changing relation of the valve head with the valve seat, which rotary movement is accelerated under abnormal conditions by an increased tilting action of the valve in seating. The successive dislocation of the valve head in relation with its seat converts the usual tendency of the valve to wear itself and the seat out of shape into one of improving the contact surfaces and eliminating the necessity of grinding.

With the above primary and other incidental objects in view as will more fully appear in the specification, the invention consists of the features of construction, the parts and combinations thereof and the mode of operation or their equivalents as hereinafter described and set forth in the claims.

Referring to the drawings in which is shown the preferred form of embodiment, Fig. 1 is a sectional view of the complete valve. Fig. 2 is a similar view of the valve and its mounting, showing the valve at the instant of opening. Fig. 3 is a top plan view of the valve head. Fig. 4 is an enlarged diagrammatic view, of the valve head. Fig. 5 is a detail view of the head of the valve stem.

Like parts are indicated by similar characters of reference throughout the several views.

In Fig. 2 of the accompanying drawing, the valve forming the subject matter hereof closes an orifice, which for illustrative purposes may be considered as the exhaust port of an explosive engine, the periphery or edge of which is beveled to afford the usual valve seat. This orifice communicates with an exhaust passage 3. A guide sleeve 4 is provided in which is mounted for reciprocatory movement the valve stem 5. It will be understood that the mounting disclosed is for illustrative purposes only and forms no parts of the invention per se. The valve stem 5 is provided at its upper end with a part-spherical head 6, the top of which is slightly crowned or convex as at 6'. The center of the spherical face 6 is co-incident with the crowned or convex surface 6' as indicated diagrammatically by the radius line in Fig. 4. The purpose of this design or proportion of the head of the stem is to afford a rocking or rolling contact of the top surface of the stem upon the cover disc of the valve head, eliminating as far as practical any rubbing or frictional contact at this point during the adjustment of the valve head.

The valve stem is actuated in any suitable manner as by a cam or tappet engaging the end of the stem and is retracted by a spring 16 fixed at one end to the valve mounting and at its lower end fixed to a collar 17 carried by the stem as is customary in such constructions.

The valve head 7 is of dished or concave formation and is preferably though not necessarily stamped from sheet material. It is provided with a centrally disposed part-spherical socket portion 8 which conforms to the contour of the valve stem head 6. The socket portion 8 contains an orifice 8' at the center or apex thereof, of somewhat greater diameter than that of the stem, thru which the stem 5 projects. This valve stem orifice has been shown in the drawing as surrounded by the marginal flange which is provided for increased strength, but is not an essential feature. The rim or periphery of the head 7 is inturned or clenched at 9 over the peripheral edge of a disc 10. The engagement of the disc 10 beneath the inturned rim 9 of the valve head 7 is such as to place the disc under sufficient tension to maintain a normally compression tight engagement of the partially spherical head 6 of the valve stem within the socket portion 8 of the head 7. Intermediate the head member 7 and the disc 10 there is formed a chamber 11 which preferably as shown in Fig. 2 though not necessarily communicates with the pressure chamber thru the orifices 12 in the disc 10. The orifices 12 are not essential to the valve construction. However, for purposes set forth in my prior application for patent aforementioned, they are desirable. The periphery of the head portion 7 is beveled at 15 to agree with the internally beveled valve seat.

As thus constructed the valve head is capable of both rotary and tilting movement in relation with the valve stem. The engagement of the stem head 6 within the socket portion 8 of the head member 7 affords a ball and socket or universal joint which enables the automatic adjustment of the valve to its seat. The grip of the valve head upon the head of the stem is sufficient to enable it to yieldingly maintain its adjusted position true with the valve seat, to which it is forced by the action of the spring and drop of the valve into engagement with such seat.

The ability of the valve head to assume tilted positions in relation with the axis of the stem 5 but parallel with the seating surface is facilitated by the shape of the head 6. The head has of cource a sliding or oscillatory movement within the socket portion 8. However, the engagement of the convex surface 6' of the stem head with the disc 10 is a rocking engagement due to the fact that the center of oscillation of the valve head is upon the convex surface 6' and coincident with the underside of the disc 10. This construction materially reduces the friction of the parts and permits a free play of the valve head thru a limited range of adjustment. However, should the valve head and stem be adjusted to relatively extreme positions where the periphery of the head surface 6' engages the under side of the disc 10, the tendency will be to increase the tension of the disc 10 which will itself upon release of the spring operate to return the valve head and stem to their normal range of tilting adjustment. While the material employed for the valve will depend somewhat upon the conditions of use, it is desirable though not essential for use in internal combustion engines, that the head portion be made of non-corrosive material, which will resist the action of the gases. There are various alloys now upon the market which will be found very acceptable for this purpose, prominent among which but not the only one, is "Monel" metal. Various alloys have been employed with success, particularly those containing some portion of nickel and preferably though not necessarily some copper and but little iron. A very satisfactory material is approximately three and one-half per cent nickel steel although the head portion 7 may be of low carbon soft steel. Inasmuch as the resilient disc 10 is subjected to intense heat, and less subjected to corrosion and pitting, steel alloys containing chromium or tungsten have been found desirable for this purpose. These materials are desirable for their heat resisting properties, and resiliency under high temperatures, rather than for strength. This desired resiliency when subjected to intense heat is usually lacking in those materials most suitable for the head portion 7. It is possible, however, to compromise the desired qualities of the material, and employ the same character of material for both the head 7 and disc 10. It will be quite obvious, that when the valve is applied to pumps, air compressors and other mechanisms where only normal temperatures are encountered. The heat resisting or corrosive resistance of the material need not be considered. Under such conditions the head 7 may be of non-ferrous, non-corrosive or soft alloys or materials of other character, as brass, bronze, according to conditions of use.

The automatic seating function of the valve head, is such that accurate fitting of the valve stem is not required. The seating of the valve head is but slightly affected, if at all by wear or looseness of the valve stem within its guide. In view of this a wide range of materials may be employed for the stem 5, hence reducing the cost of manufacture. The stem 5 may be of any suitable carbon steel, although for internal combustion engines, the stem is preferably made from high carbon steel vanadium or chrome-vanadium according to the type of engine, the strain and wear to which it is subjected, and other conditions of use.

The engagement of the head 6 within the socket 8 affords a universal joint, permitting not only relative tilting but also rotary movement of the head and stem. The location of the center of the head 6 upon the contact surface of the convex face 6' with the under side of the disc 10 affords a rolling or rocking frictionless engagement between the head 6 and disc 10.

Surrounding the stem 5 is the usual helical retracting spring 16, having fixed connection at one end with the valve mounting and fixedly connected to a collar 17 carried by the stem 5 at its opposite end. In operation, the usual tappet engages the lower end of the valve stem and elevates it against the tension of the retracting spring 16 to lift the valve head off of its seat. Upon the initial impact of the tappet the resilient disc 10 yields slightly under the thrust of the stem 5 before the inertia of the head 7 and the pressure or resistance to the movement thereof is overcome. This initial thrust and yielding of the disc 10 causes the head 6 of the stem 5 to disengage from the socket 8 momentarily. This initial movement opens an auxiliary bypath thru the ports 12 and orifice 8' as indicated by arrows in Fig. 2, if the ports 12 have been provided and an initial release of pressure is desired. This feature of the invention, however, is fully set forth and described in my prior Patent 1,342,419. However, in the present instance, this initial release of the stem head 6 from the socket 8 has an additional and somewhat different function.

The helical spring 16 being firmly engaged at its lower end with the valve stem and equally firmly engaged at its upper end with the valve mounting, the compression of the spring under the influence of the tappet tends to increase its diameter slightly by an unwinding tendency of the helix. This torsional movement of the spring transmits to the stem a slight twisting or helical movement during its reciprocation. This twisting movement of the stem, is thought to be present in the ordinary rigid type of engine valve, but in such construction the return movement of the valve is thru a like helical or twisting movement of equal extent, so that the rigid or ordinary type of valve repeatedly seats itself in the same relation with its seat. In the present instance, the dislocation or disconnection of the valve stem 5 from the head 7 at the initial impact of the tappet is utilized to afford the valve head and stem a differential twisting or helical movement by which the head 7 is reseated after each operation in a different rotary position. This helical or twisting movement of the valve stem 5 during the initial independent vertical actuation of the stem while the head 6 is lifted from engagement in the socket 8 is effected independent of the head 7. That is to say, momentarily the head 7 remains at rest while the stem 6 is given a vertical and at the same time a slight rotary movement, before the inertia of the head 7 is overcome. As the resistance of the head 7 is overcome, the resiliency of the disc 10 returns the head into firm engagement with the stem and the remainder of the up stroke and all of the return stroke of the stem and valve head is effected in unison one with the other. At each impulse the stem is given a slight rotary dislocation in relation with the head 7, so that upon the return stroke of the head in unison with the stem, the head is given a slightly greater spiral or twisting movement, and finds a new contact upon the seat 2, slightly turned from its previous position. In other words, the initial impact of the tappet upon the stem disengages the head 6 of the stem from the valve head 7, the latter being retarded by the inertia of its weight and the pressure thereon. The stem advances independent of the head 7 for a portion of the stroke, against the resilience of the disc 10 in a spiral path before the head 7 is unseated The entire unit being engaged during the return stroke is actuated in unison thru the full spiral stroke. Thus the difference between the upward and downward spiral movement of the head in unison with the stem determines the degree of dislocation or rotation of the head in relation with its seat at each impact. While this dislocation is very slight, for each single operation, it has been found by experiment that there is a constant travel of the head 7 upon its seat which tends to wear the valve head uniformly into perfect seating contact and to maintain perfect seating surfaces. In fact, the construction can be placed in practice, and successful operation, without any preliminary grinding of the seat or valve.

The head 7 being free for rocking or tilting movement in addition to its rotary movement independent of its stem, is enable to automatically assume a position in absolute parallelism with the seat 2, thus obviating any side slip or skew movement of the valve as a whole during the final seating contact. Moreover, should the valve or seat be inaccurately shaped, inaccuracy is automatically compensated for as is also any deposit of carbon or unevenness on either contacting surface. In the event of any unevenness or carbon deposit, the tilting of the valve affords a more effective closure for the port and minimizes losses of fuel and compression.

Deposits of carbon or uneven surfacing of the valve seat causes a tilting in offcenter direction, that is to say in the direction of chords of segment less than a half circle. This offcenter tilting is progressively effected whereby the valve is temporarily given a slight wabble movement or rolling contact, upon the inclined seating surface of the valve. The impingement of the head 7 upon such carbon deposit or uneven spot upon the valve seat, and consequent progressive tilting, causes the head 7 to describe a helical path in finding its seat in which it acts somewhat like a pinion, in an internal gear, traveling thru such spiral or helical path upon the inclined seat, slightly greater than the peripheral extent of the head 7, which action transmits to the head 7 a slight increased rotary tendency, thereby temporarily accelerating the rotation induced by the action of the spring 16. This accelerated rotation will continue only so long as some obstruction is present upon the contact surface. The resulting rotation tends to wear away such deposit or uneven spot and when the uniform contact surface has been restored, this accelerated rotation will cease.

The rotation of the head 7 upon the stem under the influence of the retracting spring 16, or the tilting action due to unevenness or obstructions upon the seat, together with the ability of the head to assume a position perfectly parallel to the seat insures complete and true seating of the valve. The accuracy with which the valve finds its seat insures the port being closed for a greater portion of each cycle, and hence effects a great saving of fuel and compression. The rotation of the valve in relation with its seat produces a highly polished uniform contact surface, without the necessity of grinding. Instead of wearing itself out of shape, the valve forming the subject matter hereof if of uneven or irregular manufacture, will automatically wear itself and its seat to proper uniform contacting relation.

The head 6 is preferably though not necessarily formed integral with the stem 5. For convenience of manufacture, it may be independently shaped and secured upon the end of the stem 5 by welding, riveting or other suitable means as shown in Fig. 5. The head 7 is preferably formed by stamping with its marginal edges upturned as shown by dot and dash lines in Fig. 4. This marginal flange is subsequently inturned or clenched over the margin of the disc 10, by swedging, spinning or by a forming operation in a suitable die. The by-path ports 12 while desirable for some conditions of use are not essential and may be entirely omitted, as shown in Figs. 1 and 4. Moreover, this by-path construction and initial release of pressure per se, forms no part of the present invention, but is fully shown and described in the prior patent aforementioned.

A loose fitting or badly worn stem 5 will not materially interfere with the seating action of the valve. Hence the valve tends to decrease the cost of maintenance, and enables old motors to be successfully operated for long periods of time. The uniformity of cross area of the oppositely disposed concave top and bottom sections 10 and 7, which are both subjected to outward or oppositely disposed strain, reduces the tendency of the valve head to wrap, which construction is further improved by the location of the contact surface 15 on the medial zone, balanced in relation with said strains.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. The combination with a poppet valve having a relatively rotatable head and stem and, a seat therefor, of means for imparting to the valve head, a successive step by step rotary movement in relation with its seat, during the normal actuation of said valve in relation thereto.

2. The combination with a poppet valve and a seat therefor, of means for simultaneously reciprocating and rotating the valve, the direction of rotation being alternated with the direction of reciprocation but to different degree whereby said valve is successively seated in different positions in relation with the seat.

3. The combination with a poppet valve and a seat therefor, of means for imparting to said valve a partial rotation in alternating directions but to different degree to a different seating relation with its seat by the reciprocatory movement of the valve.

4. A poppet valve having a relatively rotatable head and stem, of means for turning the valve head thru successive partial rotations to different positions in relation with the valve stem and with its seat in unison with the reciprocation of the valve.

5. A valve stem, a valve head carried thereby and capable of rotary movement independent of the stem, and means for actuating the head thru a rotary movement in relation with the stem by the reciprocatory movement of said stem.

6. A valve stem, a valve head carried thereby and capable of rotary movement independent of the stem, and means for imparting to the stem a partial rotation in one direction independent of the head in unison with its reciprocatory movement.

7. A valve stem, a valve head carried thereby and capable of rotary movement in one direction independent of the stem, the return movement of the stem being effected in unison with the head and means for inducing such relative movement of the head and stem.

8. A valve stem, a valve head carried thereby, the stem and head being capable of independent relative rotary movement, means for imparting to the stem a twisting movement in unison with its reciprocatory movement, and means whereby a portion of the twisting movement in one direction is effected independent of said head, the stem and head being movable in the opposite direction in unison.

9. In a poppet valve, a valve stem, a valve head carried thereby, said stem and head being capable of independent rotary movement, clutch means intermittently engaging and releasing the stem and head, means for twisting the stem while momentarily released from driving engagement with the head and for returning the stem while engaged therewith.

10. In a poppet valve, a stem, a valve head carried thereby, means for imparting to the valve stem an alternating twisting movement, and means for temporarily disengaging the head and stem during the twisting movement of the stem in one direction and engaging the head and stem for movement in unison during the twisting movement in the opposite direction.

11. In a poppet valve, a stem, a valve head yieldingly engaged therewith, a helical retracting spring imparting to the stem a twisting movement in unison with its reciprocatory movement, said head being temporarily released from the stem by the initial reciprocatory movement thereof, and reengaged therewith for movement in unison with the stem during the remainder of its movement whereby head and stem are revolubly dislocated in relation one with the other.

12. In a poppet valve, a stem, a valve head adjustably mounted thereon, a helical retracting spring, the torsional action of the spring under the influence of compression and expansion being transmitted to the head thru the stem to effect a step by step rotation of the head relative to the stem.

13. In a poppet valve, a stem, a valve head adjustably carried thereby, a valve seat engaged by the head, a helical retracting spring subjected to expansion and contraction, the resulting torsional action of which is transmitted thru said stem to said head to effect a rotary displacement thereof in relation with the valve seat at each reciprocatory movement of the valve, whereby the head engages its seat successively in different relative positions.

14. In a poppet valve, a stem, a valve head flexibly mounted thereon and capable of a tilting and rotary movement in relation therewith, a valve seat adapted to be engaged thereby said head adapted to be progressively tilted in changing directions during its engagement with the seat to effect a rolling contact with the seat upon a helical path slightly greater than the circumference of the head on the line of contact and means for inducing such rolling action, whereby said head is caused to assume a different final position in relation with the seat at each operation.

15. In a construction of the character described, a reciprocatory valve stem, a disc like valve head yieldingly connected with the stem for tilting and rotary movement independent thereof, an annular valve seat having a beveled seat adapted to be engaged by the valve head with a rolling contact when tilted to a nonparallel relation with the plane of the seat and means for inducing such rolling action whereby said head is caused to assume different final positions of revoluble adjustment in relation with the seat.

16. In a construction of the character described, a reciprocatory stem, a disc like valve head yieldingly connected to the stem and capable of tilting and rotary movement in relation therewith, an annular valve seat from which the head is adapted to be disengaged at each operation of the stem, the progressive reengagement of the tilted head with the seat circumferencially in relation with the head and seat at each seating movement of the valve effecting a rotation of the valve head in relation with the valve seat and a retracting spring for inducing such progressive reengagement, substantially as specified.

17. In a construction of the character described, a valve stem, a valve head carried thereby and flexibly connected with the stem for independent tilting and rotary movement, a valve seat adapted to be engaged thereby with a progressive tilting movement in a circumferencial direction and means for inducing such progressive tilting movement whereby a rotary movement of the head in relation with the seat is induced, substantially as specified.

18. In a poppet valve, a stem having a head thereon with a convex end face, a hollow valve head in which the head of said stem is engaged for relative rocking movement about a center coincident with one side of said hollow valve head.

19. In a poppet valve, a valve stem, a head on said stem having oppositely disposed convex surfaces, the focus of one convex surface being coincident with the opposite convex surface, and a recessed valve head in which said head is engaged.

20. In a poppet valve a hollow valve head, a valve stem, a head upon said stem engaged within the interior of said valve head wherein it has a rocking contact upon one of the walls of said valve head and a sliding movement upon the opposite wall concentric with the point of rocking contact.

21. In a poppet valve, a valve head comprising two spaced walls peripherally connected one with the other, one of the walls having a parti-spherical depression therein, a valve stem, a parti-spherical head on said stem engaging in said depression to afford a universal joint, the opposite face of said head having a convex surface intersecting the center of said parti-spherical surface.

22. In a poppet valve, a hollow valve head, a stem therefor, a part spherical head upon said stem within said valve head, the outer end of said head being convex and having a rocking thrust bearing upon one wall of the valve head, the spherical face of the head being engaged in a correspondingly shaped socket in the valve head for limited universal adjustment.

23. In a poppet valve of the character described, a valve head comprising two separated walls peripherally engaged one with the other, a valve stem, a part spherical head upon said stem, a socket formed in one wall of said valve head and engaged by the spherically shaped face of said head, the opposite face of the head having a thrust bearing upon the opposite wall of said valve head.

24. In a poppet valve of the character described, a valve stem, a partially spherical head carried thereby, and a valve head yieldingly connected with the head of said stem for universal movement relative thereto.

25. In a poppet valve of the character described, a valve stem, a part spherical head carried thereby, a valve head flexibly mounted upon the head of said stem and having a rocking contact upon the surface of said head other than the spherical surface.

26. In a poppet valve of the character described, a valve stem, a partially spherical head thereon, a valve head mounted for rocking movement on the head of said stem, every part of spherical face of the valve stem head being equidistant from the point of rocking contact of the valve head upon the end of the stem head.

27. In a poppet valve of the character described, a valve stem, a head having a convex terminal face carried thereby, a valve head mounted for rocking movement upon the head of said stem, the convex surface of said head of the stem having yielding thrust engagement with the valve head.

28. A poppet valve for internal combustion engines comprising a stem and valve head carried thereby, said head and stem being relatively movable in relation one with the other, the valve head comprising two members peripherally connected one to the other and centrally separated, one of said members containing in its composition a percentage of nickel, the other containing in its composition a percentage of tungsten, the last mentioned member yieldingly resisting the relative movement of the head and stem.

29. In a poppet valve, a valve stem, a valve head carried thereby, the stem and valve being capable of relative movement independent of each other, said valve head including two members one superposed upon the other and one composed of a nickel alloy, the other composed of steel containing a percentage of tungsten.

30. A poppet valve comprising a valve head of a metallic alloy containing a percentage of nickel, a resilient disc connected therewith of steel containing a percentage of tungsten, and a relatively movable valve stem connected with said head and abutting upon said disc.

31. A valve stem, a valve head carried thereby, the stem and valve being capable of relative movement independent of each other, said head comprising two disc like members peripherally connected one to the other, one of which forms a yielding abutment for the stem, said abutment member being composed of material having the property of retaining its resiliency under high temperatures.

32. A valve stem, a valve head carried thereby, the stem and valve being capable of relative movement independent of each other, said head comprising two disc like members peripherally connected one to the other, one of which forms a yielding abutment for the stem, said abutment member being composed of material containing a percentage of tungsten.

33. A poppet valve for internal combustion engines comprising a stem, a valve head carried thereby, said head and stem being relatively movable, and an overlying plate of heat resistant material resisting the relative movement of the head and stem, mounted on and carried by the valve head.

34. A poppet valve for internal combustion engines comprising a stem, a valve head carried thereby, said head and stem being relatively movable, and a disc of tungsten steel overlying the valve head yieldingly resisting the relative movement of the head and stem and peripherally connected to said head.

35. A poppet valve for internal combustion engines comprising a valve stem, a relatively movable valve head carried thereby composed of a metallic alloy containing nickel, and a disc of heat resistant material overlying the said valve head against the resistance of which the relative movement of the head and stem is effected.

36. A poppet valve for internal combustion engines comprising a valve stem, a valve head carried thereby composed of a metallic alloy containing nickel, the stem and head being relatively movable, and a metallic disc capable of retaining its resiliency under high temperatures overlying the said valve head and exerting a constant pressure upon said stem.

37. A poppet valve, comprising a reciprocatory valve stem, a valve head carried thereby and capable of relative rotary movement, but normally held to the stem for unison movement therewith and means for inducing rotative movement of the valve stem in one direction independent of the valve head and in the reverse direction together with the valve head in order that said valve head will successively seat in different positions of rotation.

38. A poppet valve comprising a reciprocatory valve stem, a valve head carried thereby and capable of relative rotary movement, but normally held to the stem for unison movement therewith, and means for inducing a partial rotation of the stem independent of the valve during at least a portion of the opening movement of the valve, the remainder of the movements of the valve head and stem being effected in unison whereby the valve will be successively seated in different positions of rotation.

39. A poppet valve comprising a reciprocatory valve stem, a valve head carried thereby and capable of relative rotary movement, but normally held to the stem for unison movement therewith, said stem being capable of a limited longitudinal movement, relatively to the head and limited revoluble movement relatively to said head during its longitudinal movement and means for inducing such relative movement of the head and stem in order that the head may be successively seated in different rotative positions.

40. A poppet valve comprising a valve head and a reciprocatory stem therefor capable of relative rotative movement in one direction independent of the valve head, the head and stem being movable in unison in reverse direction, and means for imparting to the stem an alternating rotary movement in unison with its reciprocatory movement.

41. A poppet valve comprising a valve head and a reciprocatory stem therefor, capable of relative rotative movement in one direction independent of the valve head, the head and stem being movable in unison in the reverse direction, and a retracting spring adapted to be compressed by the longitudinal movement of the valve stem, the torsional action of which imparts to the valve stem an alternating partial rotary movement in unison with its reciprocation.

42. A poppet valve comprising a valve head and a reciprocatory stem therefor capable of relative rotative movement in one direction independent of the valve head, the head and stem being movable in unison in the reverse direction, and means for inducing rotary movement of the valve stem at each operative movement of the valve in order that the valve head may successively seat in different rotative positions.

In testimony whereof, I have hereunto set my hand this 7th day of May, A. D. 1920.

LUPU WILLIAM BRENNER.